United States Patent Office 3,153,017
Patented Oct. 13, 1964

3,153,017
NITROGEN-CONTAINING LINEAR POLYESTERS FROM AMINO METHYL CYCLOHEXANOL AND DICARBOXYLIC ACIDS
John R. Caldwell and Russell Gilkey, Kingsport, Tenn., assignors to Eastman Kodak Company, Rochester, N.Y., a corporation of New Jersey
No Drawing. Filed June 29, 1961, Ser. No. 120,474
16 Claims. (Cl. 260—78)

This invention relates to highly polymeric linear condensation polymers prepared by condensing either or both of cis or trans 4-aminomethylcyclohexanemethanol with one or more bifunctional reactants. A particular embodiment of this invention relates to highly polymeric linear polyesters and polyester-amides prepared by condensing (1) either or both of cis or trans 4-amino-methyl-cyclohexanemethanol with (2) one or more bifunctional carboxy compounds.

In a co-pending case of our co-workers Kibler, Bell and Smith, Serial No. 823,296, filed June 29, 1959, now U.S. Patent No. 3,033,827, said case being a continuation-in-part of Serial No. 554,639, filed December 22, 1955, now U.S. Patent No. 2,901,466, are disclosed highly polymeric linear condensation polymers of at least three constituents as follows: 1,4-cyclohexanedimethanol (cis or trans isomers), a dicarboxylic acid and an aminoalcohol. Among the aminoalcohols disclosed for use in said co-pending application is 4-aminomethylcyclohexanemethanol, which is disclosed as a novel compound in a co-pending application by our co-workers Elam and Poe in U.S. Serial No. 40,188. These co-pending applications disclose the prior art and the unobviousness of polymers of at least three-components described therein. We have now found that a polymer of enhanced physical properties can be prepared by using only the two components 4-aminomethylcyclohexanemethanol and a phenyl ester of a hexacarbocyclic dicarboxylic acid, or a hexacarbocyclic dicarboxylic acid.

As used in this specification the terminology 4-aminomethylcyclohexanemethanol includes either or a mixture of both cis and trans isomers. The preferred usage is at least 50% of the trans isomer. The letters AMCM have the same meaning. A useful mixture of isomers is about 70% trans plus 30% cis.

Unexpected properties exhibited by the poly(esteramides) of our invention include a higher second-order transition temperature which leads to a higher heat distortion temperature for articles prepared from the poly (ester-amides). The polymers of this invention are also less readily crystallizable than linear polyesters of the prior art. This is an especially desirable characteristic for polymers such as the ones described herein which are particularly useful for casting into film, in addition to being valuable as fibers, molded articles, coating materials, and the like. Other valuable uses include the production of strong, elastic fibers that have high softening points and the production of molded objects which are transparent when molded and remain transparent even under severe conditions of use, said molded objects additionally being of a high impact strength and a high degree of surface hardness. The polymers of this invention are also valuable as sheets, films and tapes, especially recording tapes. A specific advantage of the polymer prepared from 4-aminomethylcyclohexanemethanol and trans-1,4-cyclohexanedicarboxylic acid is its use in the manufacture of films and sheets by the casting method because of its solubility in a mixture of methylene chloride and methanol. Additional highly desirable properties of the polymers of the present invention are unexpectedly high melting temperatures, chemical stability, physical stability, dyeability to deep shades without the use of a carrier or the like, weather resistance, resistance to heat distortion, hydrolytic stability (which is an important factor in weathering), utility as a dielectric or other product having desirable electrical properties under humid conditions.

The bifunctional reactants or hexacarbocyclic dicarboxylic acids and their phenyl esters which are employed to prepare the polymers of this invention contain no other reactive (functional) substituents which would interfere with the formation of linear polymers as defined by Carothers in his earlier work in this field. Such bifunctional reactants and the methods for preparing polymers from them are well known in the art and illustrated in numerous patents and in the literature as well as in the abovementioned U.S. Patent No. 2,901,466.

The objects of the present invention include providing polymers of the components mentioned above having the advantageous properties enumerated as well as products produced therefrom as described. Other objects will become apparent elsewhere herein.

According to a preferred embodiment of this invention are provided which are linear highly polymeric polymers of (1) one or more hexacarbocyclic dicarboxylic polymers or one or more phenyl esters of a hexacarbocyclic dicarboxylic acid and (2) AMCM, these reactants being used in substantially equal molar amounts (although in some cases a slight excess of either component may be desirable), which polymer melts at at least about 250° C. and is capable of being formed into fibers. The inherent viscosity of the polymer as measured in a mixture of 40% tetrachloroethane plus 60% phenol is generally above about 0.4.

Generally the inherent viscosity of the polymers of this invention lies in the range of 0.4–1.0, although higher or lower values are also contemplated and their melting point is above about 250° C. In most cases the melting point of the polymer is above 290° C.

The hexacarbocyclic dicarboxylic acids preferred for use in our invention have the carboxy radicals attached to a hexacarbocyclic nucleus in para relationship. Representative of such acids are trans-1,4-cyclohexanedicarboxylic acid, p,p-sulfonyldibenzoic acid, 4,4'-diphenic acid, 4,4'-benzophenonedicarboxylic acid, 1,2-di(p-carboxyphenyl) alkanes (1 to 10 carbons), and the like. Such acids as are contemplated generally contain from about 8 to 40 carbon atoms.

The preparation of the polymers of this invention can be accomplished by melt phase or solid phase techniques as described in the abovementioned U.S. Patent No. 2,901,466, the examples of the parent application, in the prior art and in the examples to folow. The methods for forming fibers, films, molded products, and the like are similarly apparent. In general, however, the polymers are made by heating the aminoalcohol and the acid ester or acid in an inert atmosphere at a temperature of from about 180° C. to about 230° C. to form a low molecular weight polymer which is then heated in vacuum to increase the molecular weight. The melt is stirred in order to facilitate the escape of volatile products. In the solid phase process, a prepolymer having an inherent viscosity of 0.3 to 0.5 is made by stirring the melt in vacuum. The prepolymer is then granulated to a particle size of 0.01 to 0.03 inch. The granules are heated in vacuum or in an inert gas stream for 1–4 hours at a temperature somewhat below the melting point to build up the viscosity. Certain metal and metal component catalysts may be used to increase the reaction rate, a preferred catalyst being lithium phenoxide. A 30% dispersion of lithium in petrolatum may be used. Other useful catalysts include lithium hydride, dibutyl tin oxide, dibutyl diphenyl tin, tin and lead oxides, and catalysts such as those described in U.S. Patent Nos. 2,720,502; 2,727,881; 2,720,504;

2,720,505; 2,720,506; and 2,720,507. The preferred amount of catalyst is from about 0.02 to about 0.2 percent by weight of the total weight of the reactants.

The recurring units in the polymer of our invention are typified by (I) 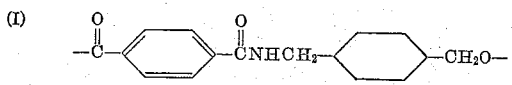

(II) 

and a mixture of I and II.

In another embodiment of this invention, a prereaction process may be used. For example, two moles of the aminoalcohol may be heated with one mole of the acid or ester or both acid and ester to form a monomeric unit containing two amide groups terminated by hydroxyl groups. Another mole of acid or ester is then added, and the reaction is then completed in the usual manner. One of the features of this particular embodiment is the higher melting point exhibited by the polymer product produced thereby.

The invention can be further illustrated by the following examples of preferred embodiments, although it will be apparent that these examples are included merely for purposes of illustration and are not intended to limit the scope of the invention unless otherwise specifically indicated.

Example 1

15.9 g. of diphenyl terephthalate and 7.15 g. of 4-aminomethylcyclohexanemethanol (70% trans) were placed in a flask equipped with a stirrer, a distillation column and an inlet for pure nitrogen. A trace of lithium phenoxide was added as catalyst. The mixture was stirred at 220° in an atmosphere of nitrogen for 15 minutes, and then at 260° for 30 minutes. A vacuum of 20–30 mm. was applied and phenol was distilled through the column. The vacuum was reduced to 0.5 mm. during a period of 30 minutes. By this time the melt had become quite viscous. The melt was cooled under vacuum and broken into ¼″ pieces. The pieces were soaked in acetone overnight to induce crystallization. The product was dried, then granulated to pass a 20-mesh screen. The prepolymer was then heated under vacuum at 180°, the temperature was raised to 260° during 1 hour, and heating was continued for 2 hours.

The polymer had an inherent viscosity of 0.93 as measured in a 60:40 mixture of phenol:tetrachlorethane. Under the polarizing microscope it melted at 298–310° C. The second-order transition temperature was 175–180°, as measured by differential thermal analysis.

This polymer is valuable for the production of fibers, films, and molded objects.

Example 2

16.2 g. of diphenyl trans-1,4-cyclohexanedicarboxylate and 7.15 g. of 4-aminomethylcyclohexanemethanol were placed in a flask and the mixture was treated as described in Example 1 above.

The polymer had an inherent viscosity of 0.74 and melted at 289–298° C. This polymer is valuable for the production of fibers, films, and molded objects. Its second-order transition temperature is 160–165°.

The polymer is especially valuable for the preparation of films by the casting method because it is soluble in a 50:50 mixture of methanol-methylene chloride. The films cast from this solution are clear and tough.

Example 3

17.2 g. of trans-cyclohexane-1,4-dicarboxylic acid and 14.3 g. of 4-aminomethylcyclohexanemethanol were placed in a vessel as described in Example 1. A trace of titanium tetraisopropoxide was added as catalyst. The mixture was stirred at 200° in an atmosphere of nitrogen for 10 minutes. The temperature was then raised to 230° and held for 30 minutes. A clear melt was obtained at this point. A vacuum of 0.5 mm. was then applied and the temperature was raised to 300°. Stirring was continued for 65 minutes. A colorless, high-viscosity melt was obtained.

The polymer had an inherent viscosity of 0.99 and melted at 265–275°. It was soluble in a 50:50 mixture of methylene chloride:methanol.

Example 4

16.6 g. of terephthalic acid and 14.3 g. of 4-aminomethylcyclohexanemethanol (70–75% trans) were placed in a vessel as described in Example 1. A trace of titanium tetra-isopropoxide was added as catalyst. The mixture was stirred under nitrogen at 230° for 45 minutes and at 250° for 15 minutes. The temperature was then raised to 290° and held for 30 minutes. After raising the temperature to 305°, a vacuum of 0.1 mm. was applied and stirring was continued for 15 minutes. A high viscosity melt was produced.

The polymer had an inherent viscosity of 0.68 and melted at 268–276°.

Fibers spun from the polymer by the melt-spinning process had a tenacity of 3.6 grams per denier, elongation of 26%, and hot-bar sticking temperature of 240° C. The fibers dyed well with cellulose acetate dyes, premetallized dyes, and some acid wool dyes.

Example 5

A prepolymer was made by heating equimolar quantities of terephthalic acid and 4-aminomethylcyclohexanemethanol, as described above. The prepolymer was granulated to a particle size of about 0.03 inch and was soaked in methanol for 12 hours to induce crystalization. It was then heated in vacuum at 260° for 2 hours. The polymer had a melting point of 290–306° and the inherent viscosity was 1.68.

Example 6

A copolymer was made having the composition 0.80 mole terephthalic acid+0.20 mole sebacic acid+1.0 mole 4-aminomethylcyclohexanemethanol. It melted at 260–270° and was particularly valuable as a high-impact molding plastic.

Example 7

Substitution of dibutyl tin oxide for lithium phenoxide as the catalyst in Example 1 gave a polymer with an inherent viscosity of 0.90. When no catalyst was used, the inherent viscosity was only 0.29.

Example 8

A polymer was made from 4,4′-sulfonyldibenzoic acid and 4-aminomethylcyclohexanemethanol. It melted at 260–275°.

Example 9

A polymer was made from 4,4′-methylenedibenzoic acid and 4-aminomethylcyclohexanemethanol. It melted at 220–235°.

Polymers as described above were formed into fibers which could be oriented by stretching to improve their properties if desired, especially for textile fabrics. Similarly they can be extruded to form films which can be biaxially oriented. Such films have utility for photographic purposes, wrapping materials, dielectrics, etc. Molding compositions can also be prepared from such polymers. In any of these forms the polymers are receptive to dyes without carriers. They are especially resistant to weathering. An outstanding property is their high second-order transition temperature in combination with an unusually well-balanced group of other desirable properties.

Although the invention has been described in considerable detail with reference to certain preferred embodiments thereof, it will be understood that variations and modifications can be effected without departing from the spirit and scope of the invention as defined in the appended claims.

We claim:

1. A highly polymeric fiber-forming linear poly(esteramide) polymer having an inherent viscosity of at least 0.4 as measured in a mixture of 40% tetrachloroethane plus 60% phenol and having a melting point of at least 250° C., which is essentially composed of the following components: (1) 4-aminomethylcyclohexanemethanol and (2) a hexacarbocyclic dicarboxylic acid.

2. A polymer as defined by claim 1 wherein component (2) is trans-1,4-cyclohexanedicarboxylic acid.

3. A polymer as defined by claim 1 wherein component (2) is terephthalic acid.

4. A polymer as defined by claim 1 where component (2) consists of 80 mole percent terephthalic acid and 20 mole percent sebacic acid.

5. A polymer as defined by claim 1 wherein the melting point is at least about 250° C.

6. A polymer as defined by claim 1 wherein the 4-aminomethylcyclohexanemethanol is from 50 to 100% trans isomer.

7. A polymer as defined by claim 1 wherein in component (2) the carboxy radicals are attached to a hexacarbocyclic nucleus is a para relationship.

8. A fiber of a polymer as defined by claim 1.
9. A fiber of a polymer as defined by claim 2.
10. A fiber of a polymer as defined by claim 3.
11. A fiber of a polymer as defined by claim 4.
12. A fiber of a polymer as defined by claim 5.
13. A film of a polymer as defined by claim 1.
14. A film of a polymer as defined by claim 2.
15. A film of a polymer as defined by claim 3.
16. A film of a polymer as defined by claim 4.

References Cited in the file of this patent

UNITED STATES PATENTS

| | | |
|---|---|---|
| 2,333,639 | Christ et al. | Nov. 3, 1943 |
| 2,396,248 | Christ | Mar. 12, 1946 |
| 3,033,827 | Kibler et al. | May 8, 1962 |